UNITED STATES PATENT OFFICE.

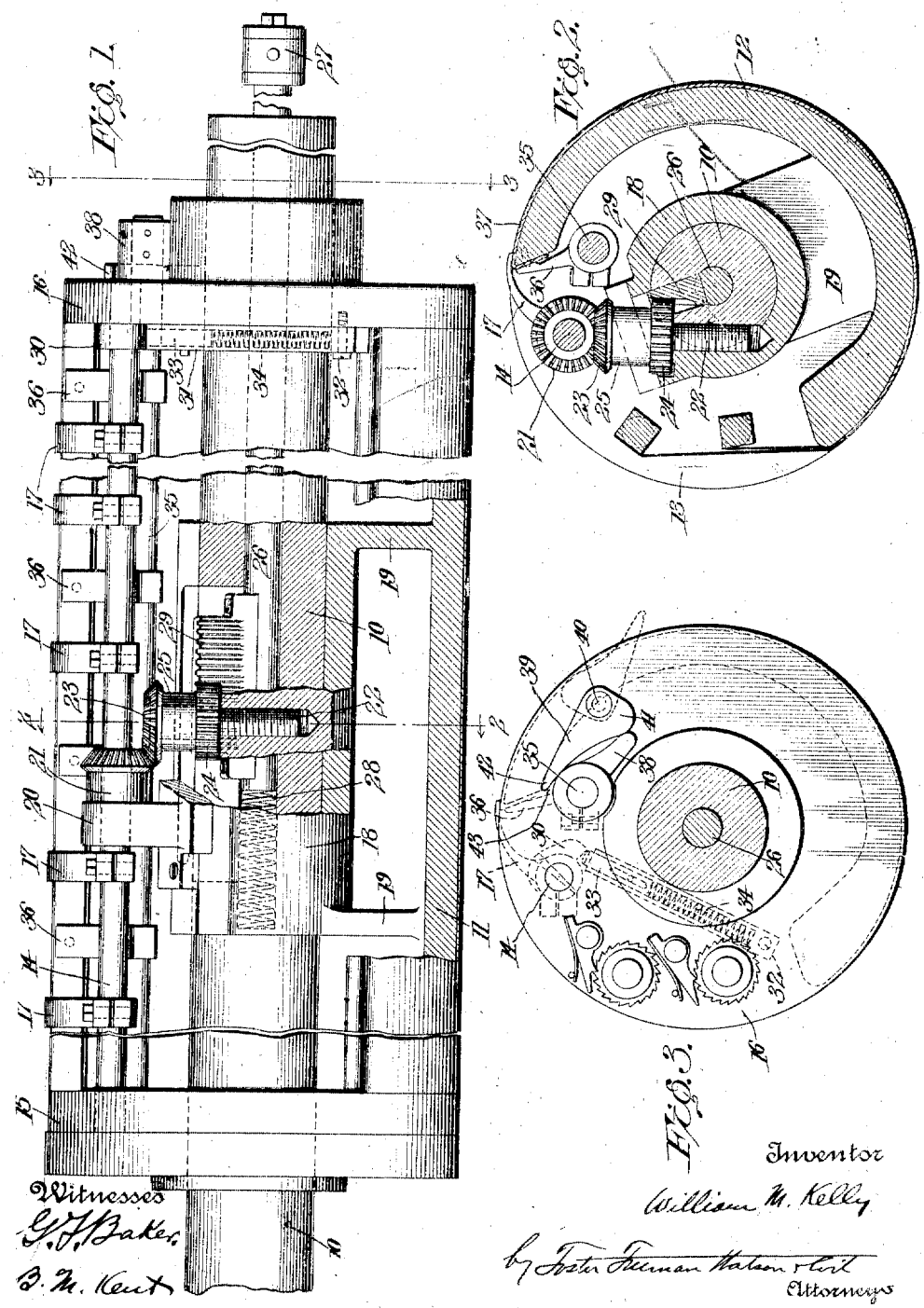

WILLIAM M. KELLY, OF JERSEY CITY, NEW JERSEY, ASSIGNOR TO AMERICAN TYPE FOUNDERS COMPANY, OF JERSEY CITY, NEW JERSEY, A CORPORATION OF NEW JERSEY.

PRINTING-PRESS.

1,227,450.

Specification of Letters Patent.

Patented May 22, 1917.

Application filed July 9, 1915. Serial No. 38,919.

*To all whom it may concern:*

Be it known that I, WILLIAM M. KELLY, a citizen of the United States, and resident of Jersey City, county of Hudson, State of New Jersey, have invented certain new and useful Improvements in Printing-Presses, of which the following is a specification.

This invention relates primarily to impression cylinders for use in connection with printing presses but is also applicable to other machines operating on sheets of paper.

One of the objects of the invention is to provide simple and reliable mechanism for actuating the grippers. A further object is to provide means for opposing the gripping movement of the gripper shaft so as to have a positive connection at all times with the gripper actuator and thereby produce uniform action of the grippers. A further object is to provide improved securing means for the clamping fingers which hold the tympan.

Other objects and the features of novelty will be apparent from the following description taken in connection with the accompanying drawings in which:—

Figure 1 is a side elevation of an impression cylinder, embodying my invention, with certain parts shown in section.

Fig. 2 is a section on the line 2—2 of Fig. 1.

Fig. 3 is a section on the line 3—3 of Fig. 1.

Referring to the drawings, 10 indicates the shaft of the impression cylinder 11. The impression surface 12 of the cylinder extends but part way around the cylinder and thus provides the open side 13 in which the grippers and other mechanism are arranged. The gripper shaft 14 is journaled in the end walls 15 and 16 of the cylinder and carries the gripper fingers 17. A sleeve 18 is arranged on the interior of the cylinder and supported by ribs 19 which are integrally formed with the sleeve and also with the impression surface 12 of the cylinder. Mounted on the sleeve 18 is a bracket 20 in which the shaft 14 is journaled. A bevel gear 21 is secured on the shaft 14 near the bracket 20, the latter serving as a support for the shaft 14 to prevent deflection thereof on account of the forces applied to the gear 21. A stud 22 is secured in the sleeve 18, as clearly shown in Figs. 1 and 2 and has journaled thereon the bevel gear 23 and the spur gear 24, these gears being rigidly connected by a sleeve 25. A rod 26 arranged in a suitable opening at the center of the shaft 10 is axially movable therein by any suitable mechanism which may be operatively connected therewith at 27. A spring 28 engages the inner end of the rod 26 and normally presses the latter outwardly, the actuating means for the rod forcing the latter inwardly in opposition to the spring 28. The rod 26 serves as an actuator for the gripper shaft 14 and carries a rack 29 which meshes with the spur gear 24 so that by reciprocating the rod 26 the shaft 14 will be oscillated.

The combination of the spur gear 24 and rack 29 provides a simple driving connection which, when the parts are accurately made will permit very little lost motion and will not be subject to much wear. The same is true of the bevel gears 21 and 23. It has been found that in the operation of high speed presses any lost motion in the parts which operate the gripper shaft causes the latter to have a more or less irregular gripping movement, that is, the sudden actuation of the shaft will cause it to be thrown ahead of its actuator and, in consequence, momentarily grip the sheet of paper and then release it before the gripper fingers positively grip the sheet. The momentary premature gripping of the sheet, above described, results in throwing the sheet out of its proper position on the impression surface and therefore the impression will be out of register. This is an especially serious matter in color printing and other cases where an exact register with previous printing must be had. In order to overcome this difficulty an arm 30 is secured on the shaft 14, adjacent the end wall 16 of the cylinder and a tubular member 31 is pivoted at 32 to the end wall 16 and carries a plunger 33 and a spring 34, the latter normally pressing the plunger to force it out of the member 31. The plunger 33 engages with the arm 30, as clearly shown in Fig. 3, and opposes the gripping movement of the shaft 14. The action of the spring pressed plunger 33 results in the lost motion in the actuating mechanism for the gripper shaft being compensated for, and a positive connection being maintained at all times between the gripper shaft and the actuator 26. The plunger 33 prevents the gripper fingers from being thrown forward into premature engagement with the sheet of paper on the feed board (not shown), which coöperates with the impression cylinder.

The impression cylinder also carries the shaft 35 on which the clamping fingers 36 for the tympan 37 are secured. In order to secure the fingers 36 in clamping position the shaft 35 carries, outside the end wall 16 of the cylinder, an arm 38. A locking dog 39 is pivoted on the end wall 16 at 40 and has a cam-shaped toe 41 which engages with the arm 38 to hold the clamping fingers 36 in the position shown in Fig. 2. The dog 39 has its end 42 adapted to engage the hub of the arm 38 as shown in Fig. 3 and any tendency for the shaft 35 to rotate in the direction to release the fingers 36 would be resisted by the coöperation of the arm 38 with the toe 41 and the dog 39 would have its end 42 pressed more firmly against the hub of the arm 38. When it is desired to release the clamping fingers 36 it is only necessary to insert a screw driver or other form of pry into the space 43 between the end 42 of the dog 39 and the hub of the arm 38 and a separation of these parts will throw the dog around to the dotted position and thus release the arm 38 and permit backward rotation of the shaft 35.

While I have illustrated what I now consider to be the preferred form of my invention it will be understood that changes may be made in the details of construction without departing from the spirit of the invention as defined in the claims, and therefore I do not wish to be limited to the exact details shown and described.

Having thus described my invention, what I claim and desire to secure by Letters Patent is:—

1. The combination of an impression cylinder, a gripper shaft, a gripper actuator, gearing connecting said actuator with said shaft, and spring means opposing the gripping movement of said shaft operable on a member driven by the gearing and whereby a positive connection with said actuator is maintained.

2. The combination of an impression cylinder, a gripper shaft, an axially movable gripper actuator arranged at the axis of the cylinder, gearing connecting said actuator with said shaft, and spring means acting directly on said shaft and opposing rotative movement thereof in one direction.

3. The combination of an impression cylinder, a gripper shaft, a gripper actuator, gearing connecting said actuator with said shaft, an arm on said shaft, and a spring-pressed member coöperating with said arm and opposing gripping movement of the shaft.

4. The combination of an impression cylinder, a gripper shaft, a gripper actuator, gearing connecting said actuator with said shaft, an arm on said shaft, and a spring-pressed member carried by the end wall of said cylinder and engaging said arm and opposing gripping movement of said shaft.

5. The combination of an impression cylinder, a gripper shaft, an axially movable gripper actuator, a rack carried by said actuator, a bevel gear on said shaft, a stud carried by said cylinder, and gears rotatable on said stud and meshing with said rack and said bevel gear and forming a driving connection therebetween.

6. The combination of an impression cylinder, a gripper shaft, a gripper actuator, gearing connecting said actuator with said shaft, and means for preventing lost motion in the mechanism comprising yielding means opposing the gripping movement of said shaft and operable on a member driven by said gearing.

7. The combination of an impression cylinder, a gripper shaft, a gripper actuator, gearing connecting said actuator with said shaft, yielding means opposing the movement of said actuator in one direction and means for preventing lost motion in the mechanism.

In testimony whereof I affix my signature.

WILLIAM M. KELLY.